United States Patent
Ogura

(10) Patent No.: US 12,466,967 B2
(45) Date of Patent: Nov. 11, 2025

(54) AQUEOUS INK COMPOSITION FOR WRITING INSTRUMENTS

(71) Applicant: MITSUBISHI PENCIL COMPANY, LIMITED, Shinagawa-ku (JP)

(72) Inventor: Kosuke Ogura, Shinagawa-ku (JP)

(73) Assignee: MITSUBISHI PENCIL COMPANY, LIMITED, Shinagawa-ku (JP)

( * ) Notice: Subject to any disclaimer, the term of this patent is extended or adjusted under 35 U.S.C. 154(b) by 808 days.

(21) Appl. No.: 17/770,127

(22) PCT Filed: Oct. 22, 2020

(86) PCT No.: PCT/JP2020/039689
§ 371 (c)(1),
(2) Date: Apr. 19, 2022

(87) PCT Pub. No.: WO2021/085294
PCT Pub. Date: May 6, 2021

(65) Prior Publication Data
US 2022/0363925 A1    Nov. 17, 2022

(30) Foreign Application Priority Data
Oct. 29, 2019    (JP) .................................. 2019-196108

(51) Int. Cl.
*C09D 11/00* (2014.01)
*C09D 11/17* (2014.01)
*C09D 11/18* (2006.01)

(52) U.S. Cl.
CPC .............. *C09D 11/17* (2013.01); *C09D 11/18* (2013.01)

(58) Field of Classification Search
CPC ................................ C09D 11/17; C09D 11/18
USPC ........................ 106/31.01, 31.13, 31.6, 31.65
See application file for complete search history.

(56) References Cited

U.S. PATENT DOCUMENTS

| | | | |
|---|---|---|---|
| 6,498,203 B1 | 12/2002 | Kito et al. | |
| 6,511,534 B1 | 1/2003 | Mishina et al. | |
| 8,109,622 B2 | 2/2012 | Goto et al. | |
| 9,045,583 B2 | 6/2015 | Ishibashi et al. | |

(Continued)

FOREIGN PATENT DOCUMENTS

| | | | | |
|---|---|---|---|---|
| CN | 101400750 A | 4/2009 | | |
| EP | 1006162 A1 * | 6/2000 | ............. | C09D 11/18 |

(Continued)

OTHER PUBLICATIONS

International Search Report issued Jan. 12, 2021 in PCT/JP2020/039689 filed on Oct. 22, 2020, 2020, (3 pages).

(Continued)

*Primary Examiner* — James E McDonough
(74) *Attorney, Agent, or Firm* — Oblon, McClelland, Maier & Neustadt, L.L.P.

(57) ABSTRACT

An aqueous ink composition suitable for writing instruments may achieve excellent color development and excellent darkness of a drawn line, while colored resin particles encapsulating a pigment are used. An embodiment of the aqueous ink composition for writing instruments includes an aqueous ink composition for writing instruments containing at least colored resin particles (A) having a pigment (p) encapsulated in, and colored resin particles (B) having a pigment (p) exposed on a surface.

20 Claims, 1 Drawing Sheet (a)

(b)

(c)

(d)

(56) References Cited

U.S. PATENT DOCUMENTS

2009/0098312 A1    4/2009   Goto et al.
2013/0165584 A1    6/2013   Ishibashi et al.
2019/0010344 A1    1/2019   Ichikawa et al.

FOREIGN PATENT DOCUMENTS

| | | |
|---|---|---|
| EP | 1 085 061 A2 | 3/2001 |
| EP | 2 578 646 A1 | 4/2013 |
| JP | 2001-19889 A | 1/2001 |
| JP | 2004-277507 A | 10/2004 |
| JP | 2010-150331 A | 7/2010 |
| JP | 2016-124179 A | 7/2016 |
| JP | 2016-124950 A | 7/2016 |
| JP | 2016-124951 A | 7/2016 |
| JP | 2017-222113 A | 12/2017 |
| JP | 2018-109113 A | 7/2018 |
| WO | WO 2017/119480 A1 | 7/2017 |
| WO | WO 2019/082888 A1 | 5/2019 |
| WO | WO 2019/146539 A1 | 8/2019 |

OTHER PUBLICATIONS

Extended European Search Report issued Oct. 31, 2023, in corresponding European Patent Application No. 20882155.3, 4 pages.

* cited by examiner (a)
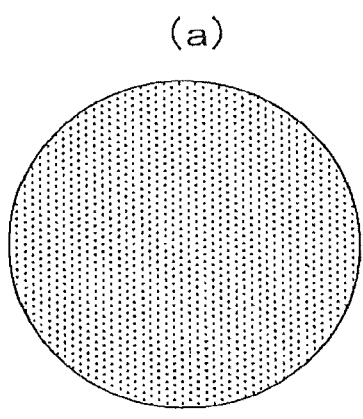
(c)
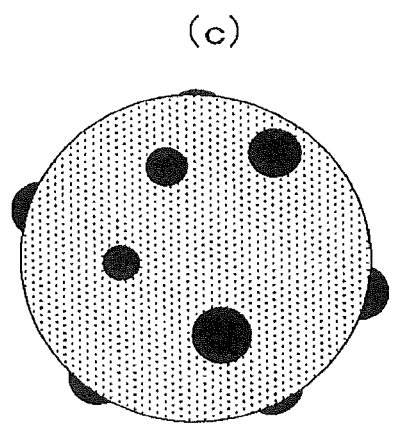
(b)
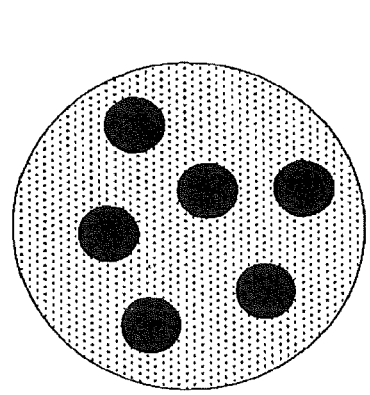
(d)
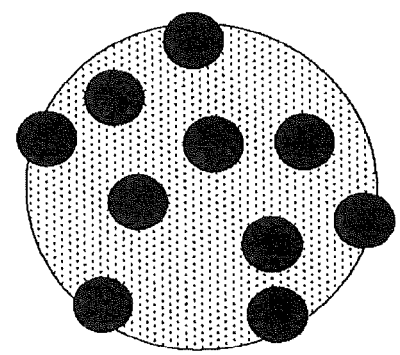

AQUEOUS INK COMPOSITION FOR WRITING INSTRUMENTS

CROSS-REFERENCE TO RELATED APPLICATIONS

The present application is the national stage of international application PCT/JP2020/039689, filed on Oct. 22, 2020, and claims the benefit of the filing date of Japanese Appl. No. 2019-196108, filed on 29 Oct. 2019, the content of each of which is incorporated by reference.

TECHNICAL FIELD

The present specification relates to an aqueous ink composition for writing instruments achieving excellent color development and excellent darkness of a drawn line without deterioration of stability over time even when colored resin particles encapsulating a pigment are used.

BACKGROUND ART

An aqueous ink containing an aqueous dispersion of pigment-encapsulated polymer particles containing (A) a hydrophilic polymer, (B) a hydrophobic polymer, and (C) a pigment and having a predetermined average particle diameter (e.g., see Patent Document 1), and an ink composition for a writing instrument formed by using a microcapsule pigment encapsulating a dye or pigment in a microcapsule wall membrane (e.g., see Patent Document 2) have been known.

The microcapsule pigments and the like encapsulating pigments described in Patent Documents 1 and 2 described above contain, in a microcapsule wall, an ordinary dye or ordinary pigment for which adjustment of particle diameter and particle distribution is easy but have problems of weaker color development compared to those of pigments alone and no capability of increasing darkness of a drawn line.

CITATION LIST

Patent Document

Patent Document 1: JP 2004-277507 A (claims, Examples, etc.)
Patent Document 2: JP 2010-150331 A (claims, Paragraph [0006], Examples, etc.)

SUMMARY OF INVENTION

Technical Problem

In light of the problems from the related art described above, the present disclosure is to solve these problems, and an object is to provide an aqueous ink composition for writing instruments achieving excellent color development and excellent darkness of a drawn line without deteriorating stability over time though colored resin particles encapsulating a pigment are used.

Solution to Problem

As a result of intensive studies in light of the above-mentioned problems and the like, the present inventors have found that an aqueous ink composition for writing instruments for the object described above can be obtained by containing at least colored resin particles encapsulating a pigment and colored resin particles using the same pigment but having different surface properties, and thus has completed the present invention.

That is, the aqueous ink composition for writing instruments of the present disclosure contains at least colored resin particles (A) having a pigment (p) encapsulated in and colored resin particles (B) having a pigment (p) exposed on a surface.

A resin component in each of the colored resin particles (A) and (B) is preferably urethane-based.

A content ratio of the colored resin particles (B) to (A), [(B)/(A)], is preferably 0.05 to 2.0 by mass.

A ratio of average particle diameters of the colored resin particles (B) to (A), [(B)/(A)], is preferably 0.5 to 2.0.

The pigment (p) is preferably carbon black.

Note that, in the present disclosure, "colored resin particle having a pigment (p) exposed on a surface" refers that, when a resin particle is viewed from the front face thereof, a plurality of parts of pigment (p) are visible on the surface of the resin particle, and that the presence rate of the pigment (p) on surface is 3 to 50%.

FIGS. 1(a) and (b) are a front view and a center longitudinal cross-sectional view schematically illustrating an embodiment of a colored resin particle (A) having a pigment (p) encapsulated in. FIGS. 1(c) and (d) are a front view and a center longitudinal cross-sectional view schematically illustrating an embodiment of a colored resin particle (B) having a pigment (p) exposed on a surface. In FIGS. 1(a) to (d), the shapes of the colored resin particles and the shape of the pigment (p) are illustrated as a sphere (in a spherical form) which is a preferred embodiment; however, the shapes of the colored resin particles and the shape of the pigment are not particularly limited and can be in a freely chosen shape.

Advantageous Effects of Invention

According to the present disclosure, provided is an aqueous ink composition for writing instruments achieving excellent color development and excellent darkness of a drawn line without deteriorating of stability over time though colored resin particles encapsulating a pigment are used.

In the present specification, both of general description above and detailed description below are exemplification and explanation and do not limit the present disclosure described in claims.

BRIEF DESCRIPTION OF DRAWINGS

FIGS. 1(a) and (b) are a front view and a center longitudinal cross-sectional view schematically illustrating an embodiment of a colored resin particle (A) having a pigment (p) encapsulated in, and (c) and (d) are a front view and a center longitudinal cross-sectional view schematically illustrating an embodiment of a colored resin particle (B) having a pigment (p) exposed on a surface.

DESCRIPTION OF EMBODIMENTS

At least some embodiments of the present disclosure will be described in detail below with reference to the figures. However, note that the technical scope of the present disclosure is not limited to the embodiments described below and may include the invention described in the claims and equivalents thereof.

The aqueous ink composition for writing instruments of the present disclosure contains at least colored resin particles (A) having a pigment (p) encapsulated in and colored resin particles (B) having a pigment (p) exposed on a surface.

Pigment (p)

In the present disclosure, the types of pigments (p) that can be encapsulated or contained in the colored resin particles (A) and (B) is not particularly limited, and any pigment can be used out of inorganic and organic pigments commonly used in aqueous ink compositions for writing instruments and the like.

Examples of the inorganic pigments include carbon black, titanium oxide, zinc oxide, iron oxide, chromium oxide, and ultramarine.

Examples of the organic pigments include azo lake, insoluble azo pigments, chelate azo pigments, phthalocyanine pigments, perylene and perinone pigments, anthraquinone pigments, quinacridone pigments, lake dyes, nitro pigments, and nitroso pigments. One type of these may be used alone, or a combination of two or more types of these may be used.

As the preferred pigment (p) encapsulated or contained in the colored resin particles (A) and (B), carbon black is desired from the perspective of making the effect of the present disclosure superior.

The content of the pigment (p) encapsulated in the colored resin particle (A) is preferably 5 to 40 mass %, more preferably 10 to 35 mass %, and particularly preferably 15 to 25 mass %.

When the content of the pigment (p) is less than 5 mass %, the coloring strength is insufficient and visibility of a drawn line may decrease. On the other hand, when the content is greater than 40 mass %, the amount of the pigment is excessive, and color reproducibility and stability over time might be deteriorated.

Colored Resin Particle (A)

The colored resin particle (A) of the present disclosure is formed from, at least, a microcapsule pigment encapsulating the pigment (p) described above, and can be produced, for example, by microencapsulating a material containing at least the pigment (p) described above, specifically, enclosing such a material in a shell layer (shell) which is formed from a wall forming material (wall material), so as to achieve a predetermined particle size.

Furthermore, the colored resin particle (A) of the present disclosure may be formed from a microcapsule pigment encapsulating a synergist (pigment derivative) together with the pigment (p) described above. The synergist (pigment derivative) to be used is a substance used in a preferred embodiment to make it easier for the pigment (p) to be embedded in the resin particle during formation of the colored resin particle and to prevent shedding of the pigment (p) from the colored resin particle. It is a derivative having a structure similar to that of the pigment (p), and is a compound exhibiting strong interaction with the pigment (p). Also, the synergist also exhibits strong interaction with a dispersant described below that is preferably used during production of the colored resin particle.

By allowing at least the synergist to be contained in addition to the pigment (p) in the colored resin particle, because the synergist has a similar structure (common backbone) as that of the pigment (p), the synergist adsorbs on the resin of the colored resin particle as well as adsorbs on the pigment surface, and thus the pigment (p) readily enters the resin particle, and the shedding prevention effect is achieved. Such interaction of the synergist is believed to be van der Waals force, and it is presumed that firm and practical adsorption can be achieved due to the interaction on the entirety of a flat and wide face of the pigment backbone. Note that, typically, the synergist is used as a dispersion aid of a pigment in a liquid medium; however, in the present disclosure, by allowing the synergist to be contained together with the pigment (p) in the colored resin particle to be formed, the effect of the present disclosure can be further exhibited.

As the synergist that can be used, a synergist that is appropriate for the pigment (p) to be used can be used. Commercially available products of synergists for the color of the pigment (p), specifically, for carbon black, for yellow pigments, for azo pigments, and for phthalocyanine pigments can be used. Examples of the commercially available products having acidic functional groups include Solsperse 5000 (phthalocyanine pigment derivative), Solsperse 12000 (phthalocyanine pigment derivative), and Solsperse 22000 (azo pigment derivative) available from The Lubrizol Corporation, BYK-SYNERGIST2100 (phthalocyanine pigment derivative) and BYK-SYNERGIST2105 (yellow pigment derivative) available from BYK-Chemie Japan K.K., EFKA6745 (phthalocyanine pigment derivative) and EFKA6750 (azo pigment derivative) available from BASF Japan Ltd., and Synergist Yellow-8020, 8404, 9043, 4827 (yellow pigment derivative); Synergist Red-3953, 4327, 4474, 4858, 4966, 5507, 5525, 5909, 6006, 6547 (azo pigment derivative); Synergist Blue-6831, 7215, 7438, 7854, 0785, 0785A (phthalocyanine pigment derivative); and Synergist Violet-6965, 7349, 7572, 7988 (phthalocyanine pigment derivative) available from Disper Material R & D Corp. One type of these may be used alone, or two or more types of these may be used in combination.

The content of these synergists in the colored resin particle is preferably varied based on the pigment type to be used and the used amount thereof. From the perspective of suitably exhibiting blending effect of the synergist and effect of the present disclosure, the pigment and the synergist to be used are preferably contained in a certain blending ratio. The mass ratio of synergist/pigment is preferably 0.01 to 0.2, and more preferably 0.05 to 0.15. By setting the mass ratio of synergist/pigment to 0.01 or greater, the pigment is less likely to be shed from the colored resin particle. On the other hand, by setting the mass ratio to 0.2 or less, aggregation of the pigment in the colored resin particle is suppressed, and deterioration of the feel at the time of writing is suppressed.

The colored resin particle (A) of the present disclosure can be produced by microencapsulating a material containing at least the pigment (p) described above or a material containing at least the pigment (p) and the synergist described above in a manner that a predetermined particle size is achieved.

Examples of the microencapsulation method include interfacial polymerization, interfacial polycondensation, in situ polymerization, in-liquid curing coating, phase separation from an aqueous solution, phase separation from an organic solvent, melt dispersion cooling, air suspension coating, and spray drying.

Preferably, from the perspective of ease of production and quality, a resin component (shell component) forming a microcapsule is preferably a thermosetting resin such as an epoxy resin, urethane, urea, or urea-urethane, and is particularly preferably a urethane-based resin, such as urethane, urea, or urea-urethane because the microcapsule can accommodate larger amounts of the components, has less limitation regarding the types of the components contained therein, and results in better redispersibility.

The urethane (polyurethane resin), urea (polyurea resin), and urea-urethane (polyurea resin/polyurethane resin) used in the formation of the shell layer are formed by letting an isocyanate component react with an amine component, an alcohol component, or the like. Furthermore, the epoxy resin used in the formation of the shell layer is formed by letting it react with a curing agent such as an amine component.

Examples of the isocyanate component that can be used include 2,4-tolylenediisocyanate, 2,6-tolylene diisocyanate, diphenylmethane diisocyanate, polymeric diphenylmethane diisocyanate, hydrogenated diphenylmethane diisocyanate, 1,5-naphthalene diisocyanate, 3,3'-dimethyldiphenyl-4,4'-diisocyanate, hexamethylene diisocyanate, isophorone diisocyanate, m-phenylene diisocyanate, p-phenylene diisocyanate, trans-cyclohexane 1,4-diisocyanate, diphenyl ether diisocyanate, xylylene diisocyanate, hydrogenated xylylene diisocyanate, 2,6-diisocyanate caproic acid, tetramethyl-m-xylylene diisocyanate, tetramethyl-p-xylylene diisocyanate, trimethylhexamethylene diisocyanate, triphenylmethane triisocyanate, tris (isocyanatephenyl) thiophosphate, isocyanate alkyl 2,6-diisocyanate capronate, 1,6,11-undecane triisocyanate, 1,8-diisocyanate-4-isocyanatemethyloctane, 1,3,6-hexamethylene triisocyanate, and bicycloheptane triisocyanate.

Furthermore, examples of the isocyanate component include diisocyanates such as m-phenylene diisocyanate, p-phenylene diisocyanate, 2,6-tolylene diisocyanate, 2,4-tolylene diisocyanate, naphthalene-1,4-diisocyanate, diphenylmethane-4,4'-diisocyanate, 3,3'-dimethoxy-4,4-biphenyl-diisocyanate, 3,3'-dimethylphenylmethane-4,4'-diisocyanate, xylylene-1,4-diisocyanate, 4,4'-diphenylpropane diisocyanate, trimethylene diisocyanate, hexamethylene diisocyanate, propylene-1,2-diisocyanate, butylene-1,2-diisocyanate, cyclohexylene-1,2-diisocyanate, and cyclohexylene-1,4-diisocyanate; triisocyanates such as 4,4',4"-triphenylmethane triisocyanate and toluene-2,4,6-triisocyanate; tetraisocyanates such as 4,4'-dimethyldiphenylmethane-2,2',5,5'-tetraisocyanate; and isocyanate prepolymers such as adduct of hexamethylene diisocyanate and trimethylolpropane, adduct of 2,4-tolylene diisocyanate and trimethylolpropane, adduct of xylylene diisocyanate and trimethylolpropane, and adduct of tolylene diisocyanate and hexanetriol. These isocyanate components may be used alone or as a mixture.

Specific examples of the amine component that can be used include aliphatic amines such as ethylene diamine, hexamethylene diamine, diaminocyclohexane, piperazine, diethylenetriamine, triethylenetetramine, tetraethylenepentamine, iminobispropylamine, diaminoethyl ether, 1,4-diaminobutane, pentamethylenediamine, 2-methylpiperazine, 2,5-dimethylpiperazine, 2-hydroxytrimethylenediamine, diethylaminopropylamine, diaminopropylamine, diaminopropane, 2-methylpentamethylenediamine, and xylenediamine; and m-phenylenediamine, triaminobenzene, 3,5-tolylenediamine, diaminodiphenylamine, diaminonaphthalene, t-butyltoluenediamine, diethyltoluenediamine, and diaminophenol. Among these amine components, aromatic amines such as phenylenediamine, diaminophenol, and triaminobenzene are preferable.

Specific examples of the alcohol component that can be used include polyols having two or more hydroxyl groups, such as ethylene glycol, 1,3-propanediol, 1,4-butanediol, 1,5-pentanediol, 1,6-hexanediol, glycerin, catechol, resorcinol, and hydroquinone. These alcohol components may be used alone or as a mixture. Furthermore, the alcohol component and the amine component may be mixed for use.

For the formation of the shell layer from a urethane-based resin of urethane, urea, or urea-urethane, the shell layer can be formed by a production method, for example, by 1) performing interfacial polymerization by dispersing a monomer component of at least one of urethane, urea or urethane-urea, and a pigment component, or 2) performing an emulsification step of dispersing an oily component (oily phase) containing an isocyanate component in an aqueous solvent (aqueous phase) to prepare an emulsified liquid, and an interfacial polymerization step of performing interfacial polymerization by adding, to the emulsified liquid, at least one of the amine component or the alcohol component.

In the above production method 2), a solvent can be used in the preparation of the emulsified liquid. For example, phenyl glycol, benzyl alcohol, ethylene glycol monobenzyl ether, ethyl acetate, alkylsulfonic acid phenyl ester, ethylhexyl phthalate, tridecyl phthalate, ethylhexyl trimellitate, diethylene glycol dibenzoate, dipropylene glycol dibenzoate, and a liquid xylene resin can be used. These solvents may be used alone or as a mixture.

On the other hand, a protective colloid may be included, in advance, in the aqueous phase that is used to emulsify the oily phase. A water-soluble polymer can be used as the protective colloid, and can be appropriately selected from among known anionic polymers, nonionic polymers, and amphoteric polymers. Particularly preferably, polyvinyl alcohol, gelatin, and a cellulose polymer compound are contained. The aqueous phase may contain a surfactant. The surfactant can be one appropriately selected from among anionic and nonionic surfactants, which does not act on the protective colloid so as not to cause precipitation or aggregation. Preferred surfactants may include sodium alkylbenzene sulphonate (e.g., sodium lauryl sulfate), dioctyl sodium sulfosuccinate, and polyalkylene glycol (e.g., polyoxyethylene nonylphenyl ether).

The oily phase made in the manner as described above is added to the aqueous phase, and emulsified using mechanical force. Then, the temperature of the system is increased as necessary, thereby causing interfacial polymerization at the oily droplet interface, so that particles can be formed. In addition, desolvation can be performed at the same time as, or after the end of, the interfacial polymerization reaction. After the interfacial polymerization reaction and desolvation, the particles are separated from the aqueous phase, washed and then dried to obtain capsule particles.

Furthermore, the epoxy resin used in the formation of the shell layer is formed by reacting with a curing agent such as the amine component or the like, and can be formed using each of the microencapsulation methods described above, for example, by interfacial polymerization. Epoxy resins to be used are epoxy resins having two or more epoxy groups in one molecule, which are commonly used without being limited in molecular weight, molecular structure, or the like. Examples thereof include aromatic epoxy resins such as bisphenol A type epoxy resins such as bisphenol A diglycidyl ether epoxy resin, bisphenol F epoxy resins, novolac epoxy resins, cresol novolac epoxy resins, and biphenyl epoxy resins; naphthalene type polyfunctional epoxy resins; glycidyl ether epoxy resins of polycarboxylic acids; glycidyl ester epoxy resins of the same; alicyclic epoxy resins obtained by epoxidation of cyclohexane derivatives such as cyclohexane polyether epoxy resin and hydrogenated bisphenol A epoxy resin; and cycloaliphatic epoxy resins such as dicyclopentadiene epoxy resins. These epoxy resins can be used alone, or two or more thereof can be mixed for use.

In the present disclosure, for formation of the colored resin particles, a dispersant is preferably used together with the pigment described above or the pigment and the synergist described above.

Examples of the dispersant that can be used include AJISPER PB821, AJISPER PB822, and AJISPER PB711 (all available from Ajinomoto Fine-Techno Co., Inc.), DISPARLON DA-705, DISPARLON DA-325, DISPARLON DA-725, DISPARLON DA-703-50, and DISPARLON DA-234 (available from Kusumoto Chemicals, Ltd.), DISPERBYK-111, DISPERBYK-2000, DISPERBYK-2001, DISPERBYK-2020, DISPERBYK-2050, and DISPERBYK-2150 (available from BYK-Chemie Japan K.K.), EFKA4010, EFKA4009, EFKA4015, EFKA4047, EFKA4050, EFKA4055, EFKA4060, EFKA4080, and EFKA4520 (available from BASF Japan Ltd.), and TEGO Dispers 655, TEGO Dispers 685, and TEGO Dispers 690 (available from Evonik Japan Co., Ltd.). In addition, other known products that are commonly and commercially available as dispersants can be also used. The dispersant is not limited to the examples described above.

The content of the dispersant in the colored resin particle is varied based on the type and the like of pigment and synergist to be used, and from the perspective of suitably exhibiting synergistic action of the pigment and the synergist and effect of the present disclosure, the content is preferably 2 to 20 mass %, and more preferably 3 to 15 mass %.

In the present disclosure, by forming a shell layer by the forming means described above, a colored resin particle (A) comprising a microcapsule pigment encapsulating at least the pigment (p), or a colored resin particle (A) comprising a microcapsule pigment encapsulating at least the pigment (p) and the synergist is obtained.

In the present disclosure, at least the content of the pigment and the content of the the synergist, if present, vary from the perspective of optionally controlling dispersibility, specific gravity, and particle diameter and also from the perspective of color development. However, when the aqueous phase component (water, PVA) and the oil phase component (solvent) are used during the production, they do not substantially remain in the colored resin particles formed. Thus, by adjusting the pigment, the synergist, the dispersant, and the resin component (balance) to be in the preferred ranges when polymerizing the raw materials in the production of the colored resin particles (e.g., pigment, synergist, dispersant, and resin component), the colored resin particles having these components in the predetermined preferred ranges described above can be obtained.

Furthermore, in the present disclosure, the colored resin particle (A) formed from a microcapsule pigment encapsulating at least the pigment and the like can be adjusted to have a predetermined average particle diameter, such as an average particle diameter of 0.1 to 30 μm, based on the purpose of the writing instrument (ballpoint pen, marking pen). A range of 0.5 to 20 μm is preferable, as it satisfies practical usability for the purposes described above.

In the present disclosure (including Examples described below), "average particle size" refers to the value of the particle size (D50) at 50% cumulative volume in the particle size distribution calculated based on the volume measured by a laser diffraction method. Here, the measurement of average particle size by a laser diffraction method can be performed using, for example, a particle size distribution analyzer HRA 9320-X100 which is available from Nikkiso Co., Ltd.

Colored Resin Particle (B)

The colored resin particle (B) of the present disclosure is a colored resin particle having a pigment (p) used in the colored resin particle (A), the pigment (p) being exposed on the surface of the particle. It is the colored resin particle described above referring to FIG. 1 (c) and (d).

This colored resin particle (B) can be produced so that it has a pigment (p) exposed on a surface, for example, by microencapsulating a material containing at least the pigment (p) or containing the pigment (p) and the synergist described above in a manner that a predetermined particle diameter is achieved in the same manner as in the production of the colored resin particle (A) described above. Specifically by reducing the amount of the resin component to be used, e.g., in the case where the resin component is urethane-based, reducing the isocyanate component (20 to 50 mass % reduction) and/or increasing the pigment (p) (25 to 100 mass % increase), compared to those for production of the colored resin particle (A), the colored resin particle (B) having a pigment (p) exposed on a surface can be produced.

For the pigment (p), the resin component, and the like that are used, raw materials used for the colored resin particle (A) described above can be employed, and thus the description of the raw materials and the production method will be omitted.

In the present disclosure, the surface presence rate of the pigment (p) on the colored resin particle (B) is 3 to 50%, and preferably 5 to 30%. Further, in the present disclosure (including Examples described below), the calculation method of the surface presence rate of the pigment (p) on the colored resin particle (B) is performed by observation with Scanning Electron Microscope (SEM) and determination by an image analysis method using the following equation. Surface presence rate (%)=(area of pigment (p)/area of colored resin particle (B))×100.

In this case, the surface presence rate is an average of 300 samples of colored resin particle (B) on which exposure of the pigment (p) has been observed. For this SEM observation, measurement can be performed by using S-4700, available from Hitachi High-Technologies Corporation, and the image analysis can be performed by using Mac-View, available from Mountech Co., Ltd.

<Aqueous Ink Composition for Writing Instrument>

The aqueous ink composition for writing instruments of the present disclosure contains at least the colored resin particles (A) encapsulating the pigment (p) and the colored resin particles (B) having the pigment (p) exposed on a surface and, for example, is used as an ink composition for a writing instrument such as an aqueous ballpoint pen or marking pen.

In the present disclosure, the total content of the colored resin particles (A) having the characteristics described above and the colored resin particles (B) having the characteristics described above is preferably 5 to 25 mass %, and more preferably 10 to 20 mass %, with respect to the total amount of the aqueous ink composition for writing instruments.

When the content of the colored resin particles is less than 5 mass %, coloring strength is insufficient and visibility of a drawn line decreases. On the other hand, the content of greater than 25 mass % is not preferable because the viscosity increases and fluidity of the ink may be deteriorated.

In the present disclosure, the content ratio [(B)/(A)] of the colored resin particles (B) having the characteristics described above to the colored resin particles (A) having the characteristics described above is preferably 0.05 to 2.0 by mass from the perspectives of further exhibiting the effect of the present disclosure and preventing destabilization of the ink due to aggregation of the colored resin particles (A) and the colored resin particles (B) over time.

The ratio of average particle diameters of the colored resin particles (B) to (A), [(B)/(A)], is preferably 0.5 to 2.0 from the perspectives of further exhibiting the effect of the present disclosure and preventing destabilization of the ink due to separation of the colored resin particles (A) and the colored resin particles (B) over time.

The aqueous ink composition for writing instruments of the present disclosure contains a water-soluble solvent in addition to the colored resin particles (A) and (B) having the characteristics described above. Furthermore, as necessary, a general-purpose colorant besides the colored resin particles (A) and (B) having the characteristics described above can be appropriately blended in a range that does not impair the effect of the present disclosure.

Examples of the water-soluble solvent that can be used include glycols such as ethylene glycol, diethylene glycol, triethylene glycol, propylene glycol, polyethylene glycol, and glycerin; ethylene glycol monomethyl ether, and diethylene glycol monomethyl ether. These solvents may be used alone or as a mixture. The amount of the water-soluble solvent is preferably 5 to 40 mass % based on the total amount of the aqueous ink composition for writing instruments.

As the colorant that can be used within a range in which the effects of the present disclosure would not be impaired, for example, a water-soluble dye, a pigment such as an inorganic pigment, an organic pigment, a plastic pigment, hollow resin particles having voids within the particles as a white pigment or resin particles (pseudo-pigment) dyed with a basic dye having excellent color development and dispersibility, or the like can be used in an appropriate amount. For the water-soluble dye, a direct dye, an acid dye, an edible dye, or a basic dye can be used in an appropriate amount within a range in which the effects of the present disclosure would not be impaired.

the aqueous ink composition for writing instruments of the present disclosure can appropriately contain, besides the colored resin particles (A) and (B) having the characteristics described above, the colorant besides the colored resin particles and the water-soluble solvent, water (e.g., tap water, purified water, distilled water, ion exchanged water, or purified water) for a solvent as the balance as well as a dispersant, a lubricant, a pH adjuster, a corrosion inhibitor, a preservative or an antibacterial agent, a thickener, or the like, within a range in which the effects of the present invention would not be impaired.

Examples of the dispersant that can be used include nonionic and anionic surfactants, and water-soluble resins. Preferably, water-soluble polymers are used.

The dispersant is not particularly limited, and a known dispersant can be used as well as a dispersant that can be obtained from a known raw material by a known method can be used.

Examples of the lubricant include, but are not limited to, non-ionic types such as fatty acid esters of polyhydric alcohols, higher fatty acid esters of sugars, polyoxyalkylene higher fatty acid esters, and alkyl phosphate esters; anionic types such as alkyl sulfonates of higher fatty acid amides and alkyl allyl sulfonates; derivatives of polyalkylene glycols, fluorochemical surfactants, and polyether modified silicones, which are also used as surface treating agents for pigments.

Examples of the pH adjuster include ammonia, urea, monoethanolamine, diethanolamine, triethanolamine, alkali metal salts of carbonic acid and phosphoric acid such as sodium tripolyphosphate and sodium carbonate, and alkali metal hydroxides such as sodium hydroxide. Furthermore, examples of the corrosion inhibitor include benzotriazole, tolyltriazole, dicyclohexylammonium nitrite, and saponins. Examples of the preservative or antibacterial agent include phenol, omadine sodium, sodium benzoate, thiazoline-based compounds, and benzimidazole compounds.

Examples of the thickener include carboxymethylcellulose (CMC) or salts thereof, fermented cellulose, crystalline cellulose, and polysaccharides. Examples of the polysaccharides that can be used include xanthan gum, guar gum, hydroxypropylated guar gum, casein, gum arabic, gelatin, amylose, agarose, agaropectin, arabinan, curdlan, callose, carboxymethyl starch, chitin, chitosan, quince seed, glucomannan, gellan gum, tamarind seed gum, dextran, nigeran, hyaluronic acid, pustulan, funoran, HM pectin, porphyran, laminaran, lichenan, carrageenan, alginic acid, tragacanth gum, alkasy gum, succinoglycan, locust bean gum, and tara gum. These polysaccharides may be used alone, or two or more thereof may be used in combination. Commercially available products of these polysaccharides, if available, can be used.

The aqueous ink composition for writing instruments of the present disclosure can be prepared by appropriately combining the colored resin particles (A) and (B) having the characteristics described above, the water-soluble solvent, and the other components, depending on the application of the ink for writing instruments (e.g., for ballpoint pens, marking pens), and then mixing those by stirring using a stirrer such as a homomixer, a homogenizer or a disperser, and, as necessary, further filtering or centrifuging the mixture to remove coarse particles in the ink composition.

The aqueous ink composition for writing instruments of the present disclosure is loaded in a ballpoint pen, a marking pen, or the like provided with a pen tip such as a ballpoint pen tip, a fiber tip, a felt tip, or a plastic tip.

The ballpoint pen of the present disclosure includes an instrument where the aqueous ink composition for writing instruments having the above-mentioned composition is accommodated in an ink container (refill) for a ballpoint pen, and a material that is not compatible with the aqueous ink composition accommodated in the ink container and has a smaller specific gravity than the aqueous ink composition such as polybutene, silicone oil, or mineral oil is accommodated as an ink follower. For example, the ballpoint pen can be produced by filling the aqueous ink composition for writing instruments in an aqueous ballpoint pen body equipped with a ballpoint pen tip having a ball with a diameter of 0.18 to 2.0 mm.

Note that the structures of the ballpoint pen and the marking pen are not particularly limited, and the ballpoint pen or the marking pen may be, for example, a direct liquid type pen or a marking pen provided with a collector structure (ink holding mechanism) using a shaft cylinder itself as an ink container in which the shaft cylinder is filled with the aqueous ink composition for writing instruments having the configuration described above.

In addition, a pH level of the aqueous ink composition for writing instruments (at 25° C.) of the present disclosure is adjusted to preferably 5 to 10, further preferably 6 to 9.5, by using a pH adjuster or the like from the perspective of usability, safety, stability of the ink itself, and matching with the ink container.

For the aqueous ink composition for writing instruments of the present disclosure composed as described above, by using at least the colored resin particle (B) having the pigment exposed on the surface of the resin particle in addition to the colored resin particle (A) containing the pigment inside, an aqueous ink composition for writing instruments achieving excellent color development and excellent darkness of a drawn line can be obtained. To enhance the color development, use of the (B) type coloring resin particle is preferred; however, since the pigment (p) is exposed, stability over time tends to be deteriorated. In the present disclosure, by the combined use with the (A) type colored resin particle, an aqueous ink composition for writing instruments achieving balanced performances as a whole can be obtained.

Furthermore, by allowing the synergist to be contained in the colored resin particle to be used, the affinity of the pigment to the resin is enhanced, shedding of the pigment is less likely to occur, and thus an aqueous ink composition for writing instruments causing no clogging in an ink flow path and further having excellent feel of writing can be obtained.

Accordingly, the colored resin particles (A) and (B) can be suitably used as colorants to be used in the aqueous ink composition for writing instruments of the present disclosure. Therefore, the target aqueous ink composition for writing instruments achieving excellent color development and excellent darkness of a drawn line can be obtained by, for example, preparation through suitably combining the blending components for ballpoint pens, marking pens, or the like.

EXAMPLES

Next, the present disclosure will be described in more detail using Production Examples, Examples, and Comparative Examples, but the present disclosure is not limited to the following Examples. Note that the term "part" in the following Production Examples means "part by mass". Colored resin particles (A)-1, (A)-2, and (B) to be used were produced by Production Examples 1 to 3 below.

Production Example 1: Production of Colored Resin Particle (A)-1

As an oil phase solution, while 11.6 parts of ethylene glycol monobenzyl ether and 1.8 parts of dispersant (DISPERBYK-111, available from BYK-Chemie Japan K.K.) were heated to 60° C., 2.0 parts of a pigment (carbon black, Cabot Mogul L, available from Cabot Corporation) and 0.2 parts of a synergist (phthalocyanine pigment derivative, Solsperse 5000, available from The Lubrizol Corporation) were added and adequately dispersed. Next, 9.0 parts by mass of a trimethylolpropane adduct of xylylene diisocyanate (TAKENATE D110N, available from Mitsui Chemicals, Inc.) as a prepolymer was added, and an oil phase solution was prepared. As an aqueous phase solution, while heating 600 parts by mass of distilled water to 60° C., 15 parts by mass of polyvinyl alcohol (PVA-205, available from Kuraray Co., Ltd.) as a dispersant was dissolved therein, and thus an aqueous phase solution was prepared.

The oil phase solution was added to the water phase solution at 60° C., and the mixture was stirred with a homogenizer for 6 hours for emulsion polymerization, thus completing polymerization. By subjecting the obtained dispersion to centrifugation, colored resin particles (A)-1 were obtained. The average particle diameter (D50) of the colored resin particles (A)-1 was 2.1 μm.

Production Example 2: Production of Colored Resin Particle (B)

Colored resin particles (B) were obtained in the same manner as in Production Example 1 except for changing the amount of trimethylolpropane adduct of xylylene diisocyanate (TAKENATE D110N, available from Mitsui Chemicals, Inc.) of Production Example 1 to 5.0 parts. The average particle diameter (D50) of the colored resin particles (B) was 1.8 μm. Furthermore, the surface presence rate of the pigment (p) in the colored resin particle (B) was 20%.

Production Example 3: Production of Other Colored Resin Particle (A)-2

Colored resin particles (A)-2 were obtained in the same manner as in Production Example 1 except for changing the amount of the dispersant (DISPERBYK-111, available from BYK-Chemie Japan K.K.) of Production Example 1 to 3.2 parts and not adding the synergist (phthalocyanine pigment derivative, Solsperse 5000, available from The Lubrizol Corporation). The average particle diameter (D50) of the colored resin particles (A)-2 was 2.7 μm.

Examples 1 to 5 and Comparative Examples 1 and 2: Marking Pen

Each aqueous ink composition for writing instruments (marking pen) was prepared by an ordinary method using the blending composition exhibited in Table 1 below.

For the aqueous ink compositions for writing instruments obtained in Examples 1 to 5 and Comparative Examples 1 and 2 described above, marking pens were made by the following method, and the darkness of drawn lines were evaluated by the following evaluation method.

These results are shown in Table 1 below.
Preparation of a Marking Pen

Each of the obtained ink compositions was filled in a marking pen [available from Mitsubishi Pencil Co., Ltd., PM-120T, pen core: ultra-fine core (POM resin), fine round core (PET fibers), ink absorber (PET fibers)].
Evaluation Method of Darkness of a Drawn Line In the marking pen described above, each of the obtained ink composition was filled. A straight line of approximately 30 cm was drawn using the marking pen on PPC paper under a condition at 25° C. and 60% RH, and the drawn line was evaluated based on the following evaluation criteria.
Evaluation Criteria:
 A: Adequately dark compared with Comparative Example 1
 B: Slightly dark compared with Comparative Example 1
 C: Equivalent or light compared with Comparative Example 1
Evaluation Method of Stability Over Time Glass vials filled with the aqueous ink compositions for writing instruments prepared in Examples 1 to 5 and Comparative Examples 1 and 2 described above were capped, and stored in an environment of 50° C. A period during which neither aggregation nor sedimentation were observed in the ink in the vial after a certain period of time has passed was determined as "the period in which stability is maintained". It was evaluated according to the following evaluation criteria.
Evaluation Criteria:
 A: 3 months or more
 B: 1 month or more and less than 3 months
 C: less than 1 month Examples 6 to 11 and Comparative Examples 3 and 4: Aqueous Ballpoint Pen Each aqueous ink composition for writing instruments (ballpoint pen) was prepared by an ordinary method using the blending composition listed in Table 2 below.

For the aqueous ink compositions for writing instruments (ballpoint pens) obtained in Examples 6 to 11 and Comparative Examples 3 and 4 described above, aqueous ballpoint pens were made by the following method, and the darkness of drawn lines was evaluated by the following evaluation method.

These results are indicated in Table 2 below.

Preparation of Aqueous Ballpoint Pen

Aqueous ballpoint pens were made using each of the obtained ink compositions. Specifically, using a holder of a ballpoint pen (trade name: SIGNO UM-100, available from Mitsubishi Pencil Co., Ltd.), a refill including an ink storage tube made of polypropylene having an inner diameter of 4.0 mm and a length of 113 mm, a stainless steel tip (superalloy ball, ball diameter: 0.7 mm) and a joint connecting the storage tube and the tip was filled with each of the aqueous inks described above, and an ink follower mainly of a mineral oil was provided at the rear end of the ink, thus making an aqueous ballpoint pen.

Evaluation Method of Darkness of a Drawn Line

In the ballpoint pen described above, each of the obtained ink composition was filled. A straight line of approximately 30 cm was drawn using the ballpoint pen on PPC paper under a condition at 25° C. and 60% RH, and the drawn line was evaluated based on the following evaluation criteria.

Evaluation Criteria:
A: Adequately darker compared with Comparative Example 3
B: Slightly darker compared with Comparative Example 3
C: Equivalent or lighter compared with Comparative Example 3

Evaluation Method of Stability Over Time

Glass vials filled with the aqueous ink compositions for writing instruments prepared in Examples 6 to 11 and Comparative Examples 3 and 4 described above were covered with caps, and stored in an environment of 50° C. to evaluate a period in which aggregation and sedimentation were not observed in the ink in the vial after a certain period of time passed as "the period in which stability is maintained" according to the following evaluation criteria.

Evaluation Criteria:
A: 3 months or more
B: 1 month or more and less than 3 months
C: less than 1 month

TABLE 1

(Total amount: 100 mass %)

| | | | Examples | | | | | Comparative Examples | |
|---|---|---|---|---|---|---|---|---|---|
| | | | 1 | 2 | 3 | 4 | 5 | 1 | 2 |
| Colored resin particle (A)-1 pigment (p) encapsulated | | Production Example 1 | 10 | 17 | | 20 | | 20 | |
| Colored resin particle (B) pigment (p) exposed | | Production Example 2 | 10 | 3 | 5 | 1 | 14 | | 20 |
| Colored resin particle (A)-2 pigment (p) encapsulated | | Production Example 3 | | | 15 | | 7 | | |
| Resin | Styrene acryl | Joncryl 63J (solid cont.: 30%) (available from BASF Japan Ltd.) | 10 | 10 | 10 | 10 | 10 | 10 | 10 |
| pH modifier | Aminomethyl Propanol | | 1 | 1 | 1 | 1 | 1 | 1 | 1 |
| Surface tension modifier | Fluoro surfactant | capstone FS-30 (solid cont.: 25%) (available from Chemours Co.) | 0.05 | 0.05 | 0.05 | 0.05 | 0.05 | 0.05 | 0.05 |
| Antifoaming agent | Silicone surfactant | KM-90 (active ingredient: 34%) (available from Shin-Etsu Chem. Co., Ltd.) | 0.1 | 0.1 | 0.1 | 0.1 | 0.1 | 0.1 | 0.1 |
| Antibacterial agent | Na benzoate | | 0.1 | 0.1 | 0.1 | 0.1 | 0.1 | 0.1 | 0.1 |
| Water | Distilled water | | Balance | Balance | Balance | Balance | Balance | Balance | Balance |
| Density in drawn line | | | A | A | A | A | A | C | A |
| Stability over time | | | A | A | A | A | A | A | C |

TABLE 2

(Total amount: 100 mass %)

| | | | Examples | | | | | | Comparative Examples | |
|---|---|---|---|---|---|---|---|---|---|---|
| | | | 6 | 7 | 8 | 9 | 10 | 11 | 3 | 4 |
| Colored resin particle (A)-1 pigment (p) encapsulated | | Production Example 1 | 12 | 16 | | | | | 18 | |

TABLE 2-continued (Total amount: 100 mass %)

| | | | Examples | | | | | | Comparative Examples | |
|---|---|---|---|---|---|---|---|---|---|---|
| | | | 6 | 7 | 8 | 9 | 10 | 11 | 3 | 4 |
| Colored resin particle (B) pigment (p) exposed | | Production Example 2 | 6 | 2 | 6 | 2 | 1 | 12 | | 18 |
| Colored resin particle (A)-2 pigment (p) encapsulated | | Production Example 3 | | | 12 | 16 | 17 | 6 | | |
| Thickener | Xanthan gum | KELZAN S (available from Sansho Co., Ltd.) | 0.32 | 0.32 | 0.32 | 0.32 | 0.32 | 0.32 | 0.32 | 0.32 |
| Pigment Dispersant | Styrene acryl | Joncryl 63J (solid cont: 30%) (available from BASF Japan Ltd.) | 6 | 6 | 6 | 6 | 6 | 6 | 6 | 6 |
| pH modifier | Triethanol amine | | 1.4 | 1.4 | 1.4 | 1.4 | 1.4 | 1.4 | 1.4 | 1.4 |
| Corrosion inhibitor | Benzotriazol | | 0.3 | 0.3 | 0.3 | 0.3 | 0.3 | 0.3 | 0.3 | 0.3 |
| Preservative | Benziso thiazoline | Bioden 421 (available from Daiwa Chemical Ind. Co., Ltd.) | 0.2 | 0.2 | 0.2 | 0.2 | 0.2 | 0.2 | 0.2 | 0.2 |
| Lubricant | Phosphate | RD-510Y (available from Toho Chemical Ind. Co., Ltd.) | 0.5 | 0.5 | 0.5 | 0.5 | 0.5 | 0.5 | 0.5 | 0.5 |
| Solvent | Propylene glycol | | 15 | 15 | 15 | 15 | 15 | 15 | 15 | 15 |
| Water | Distilled water | | Balance | Balance | Balance | Balance | Balance | Balance | Balance | Balance |
| Density in drawn line | | | A | A | A | A | A | A | C | A |
| Stability over time | | | A | A | A | A | A | A | A | C |

As is clear from the results in Table 1 and Table 2 above, it was confirmed that the aqueous ink compositions for writing instruments (marking pens, ballpoint pens) of Examples 1 to 11, which were within the scope of the present disclosure, were aqueous ink compositions for writing instruments achieving excellent darkness of drawn lines and no deterioration of stability over time compared to those of Comparative Examples 1 to 4, which were outside of the scope of the present disclosure.

INDUSTRIAL APPLICABILITY

The aqueous ink composition for writing instruments suitable for, for example, an aqueous ballpoint pen and a marking pen is provided.

The invention claimed is:

1. An aqueous ink composition suitable for a writing instrument, the composition comprising:
   colored resin particles (A) having a pigment (p) encapsulated in the colored resin particles (A); and
   colored resin particles (B) having a pigment (p) exposed on a surface,
   wherein the colored resin particles (B) are produced by reducing an amount of a resin component used and/or increasing the pigment (p), compared to amounts for producing the colored resin particle (A).

2. The aqueous ink composition of claim 1, wherein a resin component in each of the colored resin particles (A) and (B) is urethane-based.

3. The aqueous ink composition of claim 1, wherein a (B)/(A) mass ratio of the colored resin particles (B) to the colored resin particles (A) is in a range of from 0.05 to 2.0.

4. The aqueous ink composition of claim 1, wherein a (B)/(A) average particle diameter ratio of the colored resin particles (B) to the colored resin particles (A) is in a range of from 0.5 to 2.0.

5. The aqueous ink composition of claim 1, wherein the pigment (p) is carbon black.

6. The aqueous ink composition of claim 2, wherein a (B)/(A) mass ratio of the colored resin particles (B) to the colored resin particles (A) is in a range of from 0.05 to 2.0 by mass.

7. The aqueous ink composition of claim 2, wherein a (B)/(A) average particle diameter ratio of the colored resin particles (B) to the colored resin particles (A) is in a range of from 0.5 to 2.0.

8. The aqueous ink composition of claim 3, wherein a (B)/(A) average particle diameter ratio of the colored resin particles (B) to the colored resin particles (A) is in a range of from 0.5 to 2.0.

9. The aqueous ink composition of claim 6, wherein a (B)/(A) ratio of average particle diameter ratio diameters of the colored resin particles (B) to the colored resin particles (A) is in a range of from 0.5 to 2.0.

10. The aqueous ink composition of claim 2, wherein the pigment (p) is carbon black.

11. The aqueous ink composition of claim 3, wherein the pigment (p) is carbon black.

12. The aqueous ink composition of claim 4, wherein the pigment (p) is carbon black.

13. The aqueous ink composition of claim 6, wherein the pigment (p) is carbon black.

14. The aqueous ink composition of claim 7, wherein the pigment (p) is carbon black.

15. The aqueous ink composition of claim 8, wherein the pigment (p) is carbon black.

16. The aqueous ink composition of claim 9, wherein the pigment (p) is carbon black.

17. The aqueous ink composition of claim 1, wherein the colored resin particles (B) are produced by reducing the amount of the resin component used by 20 to 50 mass % and/or increasing the pigment (p) by 25 to 100 mass %, compared to the amounts for producing the colored resin particle (A).

18. The aqueous ink composition of claim 1, wherein the colored resin particles (A) are produced by enclosing the pigment (p) in a shell layer, the shell layer being formed from a wall forming material.

19. The aqueous ink composition of claim 1, wherein the pigment (p) on the colored resin particle (B) is present in a surface presence rate in a range of from 3 to 50%.

20. The aqueous ink composition of claim 1, wherein the pigment (p) on the colored resin particle (B) is present in a surface presence rate in a range of from 5 to 30%.

* * * * *